United States Patent
Shao et al.

(10) Patent No.: US 10,405,319 B2
(45) Date of Patent: Sep. 3, 2019

(54) TECHNIQUES TO ENHANCE WIRELESS PERSONAL AREA NETWORK PERFORMANCE UNDER INTERFERENCE CONDITIONS

(71) Applicant: INTEL CORPORATION, Santa Clara, CA (US)

(72) Inventors: Lei Shao, Sunnyvale, CA (US); Krishnan Rajamani, San Diego, CA (US); Charles L. Brabenac, Portland, OR (US); Radhakrishnan Sankar, Cupertino, CA (US); Ulun Karacaoglu, San Diego, CA (US); Xintian E. Lin, Mountain View, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/311,804

(22) PCT Filed: Jun. 25, 2014

(86) PCT No.: PCT/US2014/044102
§ 371 (c)(1),
(2) Date: Nov. 16, 2016

(87) PCT Pub. No.: WO2015/199680
PCT Pub. Date: Dec. 30, 2015

(65) Prior Publication Data
US 2018/0234978 A1    Aug. 16, 2018

(51) Int. Cl.
H04W 72/08    (2009.01)
H04W 72/02    (2009.01)
(Continued)

(52) U.S. Cl.
CPC ..... *H04W 72/082* (2013.01); *H04W 28/0236* (2013.01); *H04W 28/0252* (2013.01);
(Continued)

(58) Field of Classification Search
CPC .......... H04L 2012/5608; H04L 12/66; H04L 2012/46; H04L 2012/5618; H04L 12/46;
(Continued)

(56) References Cited

U.S. PATENT DOCUMENTS

2010/0008229 A1    1/2010  Bi et al.
2010/0317339 A1    12/2010 Koc
(Continued)

OTHER PUBLICATIONS

International Search Report dated Mar. 24, 2015 for International Patent Application No. PCT/US2014/044102.

*Primary Examiner* — Brenda H Pham

(57) ABSTRACT

An apparatus to manage wireless communications may include an interface component to monitor channel load over a multiplicity of communications channels in an least one wireless communications band, and an interference management component to identify an active channel of a wireless local area network (WLAN) link, and identify a select channel from the multiplicity of communications channels that is orthogonal to the active channel of the WLAN link to transmit wireless data over a wireless personal area network (WPAN) link.

22 Claims, 12 Drawing Sheets

(51) Int. Cl.
*H04W 48/16* (2009.01)
*H04W 28/02* (2009.01)
*H04W 72/04* (2009.01)
H04W 84/12 (2009.01)
H04W 48/18 (2009.01)

(52) U.S. Cl.
CPC ........... *H04W 48/16* (2013.01); *H04W 72/02* (2013.01); *H04W 72/0453* (2013.01); *H04W 48/18* (2013.01); *H04W 84/12* (2013.01)

(58) Field of Classification Search
CPC ..... H04W 84/12; H04W 88/08; H04W 80/04; H04W 88/06; H04W 84/18; H04W 74/08; H04W 8/26; H04W 84/08; H04W 76/02; H04W 72/04; H04W 72/082; H04W 72/02; H04W 48/16; H04W 28/0236; H04W 28/0252; H04W 72/0453; H04W 48/18
USPC .............................................. 370/235, 310.1
See application file for complete search history.

(56) References Cited

U.S. PATENT DOCUMENTS

| | | |
|---|---|---|
| 2011/0292886 A1 | 12/2011 | Lee et al. |
| 2012/0044815 A1 | 2/2012 | Geirhofer et al. |
| 2014/0095755 A1* | 4/2014 | Gao ...................... G06F 13/387 710/303 |
| 2014/0128073 A1 | 5/2014 | Farhadi |
| 2015/0043493 A1* | 2/2015 | Gajanan ................ H04W 16/14 370/329 |

* cited by examiner

| Cases | Band(s) supported by Miracast Group Owner (GO) | Channel(s) supported by Miracast Group Client (GC) | Selected Miracast channel |
|---|---|---|---|
| 1 | 2.4G | 2.4G | $arg\left[\max_{ChY_i} Exp\_TPT\_ChY_i\right]$ in 2.4G & orthogonal to the selected WLAN channel |
| 2 | 2.4G | 2.4G & 5G | $arg\left[\max_{ChY_i} Exp\_TPT\_ChY_i\right]$ in 2.4G & orthogonal to the selected WLAN channel |
| 3 | 2.4G & 5G | 2.4G | $arg\left[\max_{ChY_i} Exp\_TPT\_ChY_i\right]$ in 2.4G & orthogonal to the selected WLAN channel |
| 4 | 2.4G & 5G | 2.4G & 5G | $arg\left[\max_{ChZ_i} Exp\_TPT\_ChZ_i\right]$ & orthogonal to the selected WLAN channel |

*FIG. 4*

TECHNIQUES TO ENHANCE WIRELESS PERSONAL AREA NETWORK PERFORMANCE UNDER INTERFERENCE CONDITIONS

CROSS-REFERENCE TO RELATED APPLICATION

This application is a national phase claiming the benefit of and priority to International Patent Application No. PCT/US2014/044102, entitled "TECHNIQUES TO ENHANCE WIRELESS PERSONAL AREA NETWORK PERFORMANCE UNDER INTERFERENCE CONDITIONS", filed Jun. 25, 2014, which is hereby incorporated by reference in its entirety.

TECHNICAL FIELD

The present embodiments are related to managing wireless communications and in particular wireless communications over wireless personal area networks and wireless local area network.

BACKGROUND

Streaming of video or other content to large area displays such as a TV through personal area network (WPAN) technology is increasingly popular. Among currently used WPAN systems many are based upon WiFi® technology (WiFi is a trademark of the WiFi Alliance), which refers to wireless technology based upon the Institute of Electrical and Electronics Engineers' (IEEE) 802.11 standards for wireless local area network communications. Wi-Fi Direct® (WiFi Direct is a trademark of the WiFi Alliance) and Intel® Wireless Display (Intel is a trademark of Intel corporation) are examples of peer-to-peer technologies that facilitate formation of a personal area network by connecting devices without requiring an access point.

Products that employ WiFi Certified Miracast (Miracast) screencasting standard are becoming increasing prevalent, because Miracast enables peer-to-peer wireless delivery of audio and video or other screen content between different devices based upon the 802.11 standard. However, this application consumes large amounts of wireless communications bandwidth because streamed content is not static. In a home environment, people often stream movies or other non-static video clips between local devices that are wirelessly coupled. In multi-unit dwellings such as apartment complex, condominiums, and townhouses the streaming of wireless content using Intel Wireless Display (WiDi) or Miracast may generate increasing wireless data traffic that is a source of interference as these technologies are more widely used. To address WiFi interference problems, some present day wireless display products have provided a partial solution to reduce the required wireless hops for transmitting data when streaming from special Internet video websites. Other attempts to address streaming congestion include adjusting bit rate streaming within a given video resolution for a Miracast personal area network (PAN) connection to reduce required wireless PAN (WPAN) bandwidth. This, however, leads to a reduced audio/visual quality for the displayed content. However, no robust approach exists to improve efficiency of streaming in a PAN environment under heavy data load conditions while preserving quality of transmitted visual content.

BRIEF DESCRIPTION OF THE DRAWINGS

FIG. 4 presents an example summary of wireless channel selection procedures.

DETAILED DESCRIPTION

Figure 1:
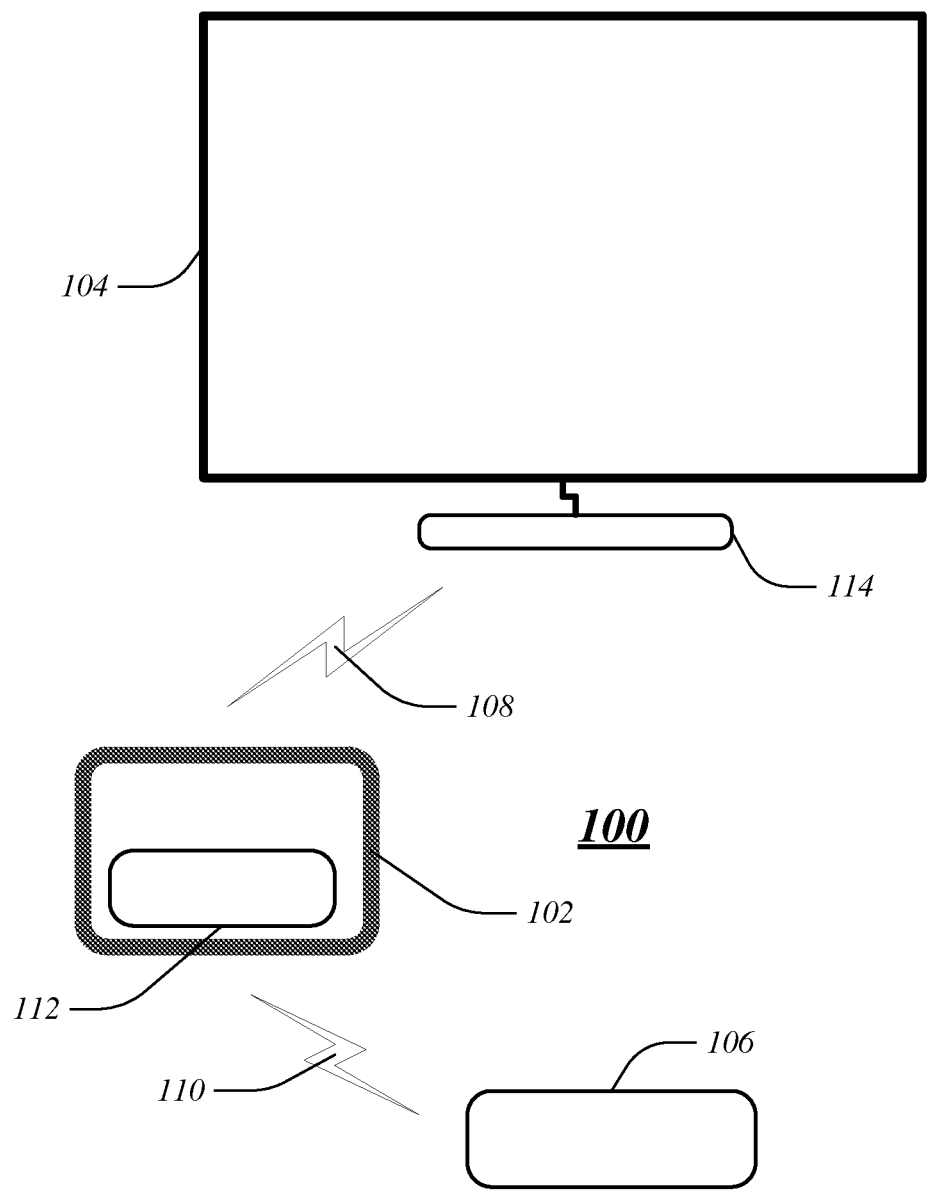
FIG. 1 depicts an exemplary system for managing wireless communications.

Embodiments provide enhancements for managing wireless communications and in particular for managing a WPAN link, WLAN link, or both, for transmitting visual data to a receiving device. In various embodiments, streaming of video data from a user device to a target device is managed in a manner that decreases interference within a wireless band(s) such as a WiFi communication band or bands while maintaining video quality. The present embodiments may be especially useful in environments in which three or more wireless devices may be used to transmit or receive wireless data among one another. The present embodiments provide, among other features, techniques for channel selection of a WPAN channel to be set up between a user device and target device, as well as techniques for routing streaming video from an access point to a target device, based upon measurement or estimation of channel load in WiFi communication band(s). Further embodiments provide techniques to adjust bit rate and/or resolution for encoding of video data based upon a congestion indicator in a WiFi environment.

In particular embodiments, when video is to be streamed from an access point to a target device, a determination is made as to whether a WiFi channel is available to serve as a WPAN link between a user device and a target device, which may be a large area display device including televisions and the like. The determination may be made based upon whether a WiFi channel to be used for the WPAN link is orthogonal to an active WLAN channel, that is, a WiFi channel being used to communicate between the access point and user device over a WLAN link. The term "orthogonal" as used herein, denotes that a radio signal transmitted within a first channel does not overlap in frequency with radio signal of a second channel to which the first channel is orthogonal. In one example, any two WiFi channels having a bandwidth of 20 MHz that are within the 2.4 GHz 802.11 communications band (also referred to herein simply as "2.4 GHz band") are deemed orthogonal to one another if they differ in channel number by at least 5. Thus, the channels 1, 6, and 11 in the 2.4 GHz 802.11 communications band are separated from one another in a manner that each is orthogonal to the others. Each channel within the 5 GHz 802.11 communications band may be deemed orthogonal to each other channel in the 5 GHz 802.11 communications band (also referred to herein simply as "5 GHz band"), and any channel within the 2.4 GHz 802.11 communications band may be deemed orthogonal to any channel in the 5 GHz 802.11 communications band.

As discussed below, the determination that a WPAN WiFi channel is available for use may further be made based upon the data load of a candidate WiFi channel. If the expected channel throughput, which may be determined from data load, meets a threshold in a candidate WiFi channel and the candidate WiFi channel is orthogonal to the active WLAN channel, the candidate WiFi channel may be chosen as a select channel for the WPAN link.

In further embodiments as detailed below, when no select channels are identified for a WPAN link that meet criteria of orthogonality and expected throughput, the streaming mode of video content may be switched to a direct streaming mode where video streams directly from an access point to target device. A notable feature of the direct streaming mode is that only a single wireless hop is used.

In other embodiments also disclosed below, when no select channel is identified that has an acceptable level of expected throughput to accommodate streaming of a video at a current video encoder bit rate, and when full screen video streaming from the internet is not set in a user device, adaptive video encoder bit rate adjustment and/or resolution adjustment may be performed.

FIG. 1 depicts an exemplary system 100 for managing wireless communications. The system 100 depicts one known arrangement that may be found in environments such as a private dwelling in which a user device 102 may be employed to manage display of visual content on another device. The visual content may be static content or dynamic content such as streaming video. In many instances a user device 102 may connect through one or more links to a remote source (not shown) such as the Internet, which provides a source of video content. In many implementations, the video content is streamed from the remote source to an access point 106, which may communicate the video content over a WLAN link 110 to the user device 102. In some examples, the user device 102 is a desktop computer, laptop computer, tablet computer, phablet, smartphone or other device, which may include a display (not shown).

Often, the operator of user device 102 may wish to view streaming video on a separate device, such as target device 104, which may have a larger display than that of user device 102. To accomplish this, the operator may establish a second wireless link, such as a WPAN link 108 that is established using Miracast or WiDi/Miracast, or other peer-to-peer streaming technology. For example, when the target device 104 is coupled to an adapter 114, which may be a Miracast adapter, the user device 102 may initiate a Miracast session to connect via the adapter 114 to the target device 104 over the WPAN link 108. This may then initiate streaming of content that may originate from access point 106 or from user device 102.

The user device 102 may in particular improve upon conventional operations in which a user device is used to manage large bandwidth wireless communication of video or other visual content to a target device. For example, in conventional operation for streaming of content such as video content from an external source such as the Internet, an access point may first receive the streaming video and transmit the streaming video over a WLAN link to a user device. Often the user device is a small display device such as a tablet computer, laptop computer, phablet, or smartphone, whose screen size may be less than desired for presentation of the streaming video, but typically less than about 20 inches diagonal. As noted, the use of peer-to-peer streaming technology such as Miracast allows video or other visual content to be conveniently wirelessly transmitted from a first device to a separate device, such as a television. However, this process is very bandwidth-consuming when the streamed content is non-static. For example, 12-15 Mbps bandwidth is needed to stream an Internet video/movie to a TV using Miracast at a 1080p resolution.

The use of such large bandwidth may create interference problems in environments in which multiple wireless devices are active at the same time. For example, in a multi-unit dwelling environment such as an apartment complex, condominium, or townhouse, WiFi signals may not be attenuated strongly between different dwellings, each of which may have one or more access points operating in the 2.4 GHz 802.11 (WiFi) communications band. Additionally, each orthogonal channel in the 2.4 GHz WiFi band (i.e., channels 1/6/11), may have, for example, 9-10 access points used simultaneously. In addition, partially overlapped channels may be used simultaneously, further increasing the interference problem. Moreover, within a given dwelling many households may have multiple mobile devices that are coupled to an access point simultaneously over the same WLAN WiFi channel. Accordingly, a Miracast streaming session to a device such as a TV may encounter and may be large source of interference, such that Miracast video streaming creates a less than desired user experience.

In the present embodiments as detailed below, a user device, such as user device 102 is equipped with components that may initiate techniques to avoid or decrease interference when a WPAN link is used to stream video to the target device 104. For example, the user device 102 may include components to monitor communications channels in at least one 802.11 communications band, such as the 2.4 GHz band and 5 GHz band. The user device 102 may also include components to choose a WiFi communications channel to be used to establish a WPAN link based upon the monitoring. As illustrated in FIG. 1, for example, the user device 102 may include an interference management component 112 that is used to identify an active channel of a wireless local area network (WLAN) 802.11 link, such as a channel in the WLAN link 110 that is used by the access point 106 to communicate data with the user device 102. When the active channel of the WLAN link 110 is identified and before a WPAN link is set up, the interference management component 112 may use the information from monitored 802.11 channels, such as channel load, to identify a select WiFi channel to transmit streaming video or other wireless data to the target device 104. For example, the select WiFi channel may be identified on the basis that it is orthogonal to the active channel in the WLAN link 110 and has an expected throughput that meets a certain criteria or threshold. If no such candidate channel is identified from among available WiFi channels, the interference management component 112 may perform further operations that are detailed below to manage streaming of video or other content to the target device 104.

It is to be noted that the interference management component 112 and other similar components as disclosed below, may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 2:
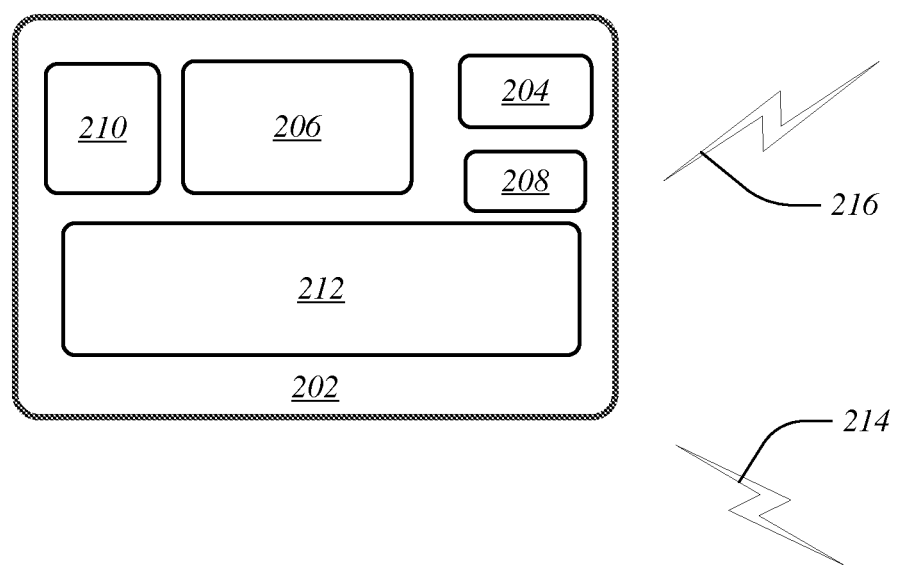
FIG. 2 depicts an exemplary apparatus for managing wireless communications.

FIG. 2 depicts details of a user device 202 in accordance with further embodiments. The user device 202 may be a laptop computer, desktop computer, netbook, tablet computer, phablet, smartphone, or other device that includes a display. The embodiments are not limited in this context. The user device 202 includes an interface component 204, which may be a wireless network interface controller (WNIC) in some instances. The user device 202 further includes an interference management component 206 whose operation is detailed below. The user device 202 also includes an encoding component 208, which may be a video encoder in some embodiments. The encoding component 208 may be included in processor circuitry 210 or may be a stand-alone component. Components of the user device 202, such as the processor circuitry 210, interface component 204, or both, may be equipped to perform streaming of visual content using Miracast or other peer-to-peer wireless technology. In particular, the user device 202 may be equipped to act as a Miracast transmitter to transmit wireless data including streaming video to an external device.

The user device 202 further includes a display 212, which may be any type of digital display. In some cases the display 212 may be a touchscreen, which may also serve as a user interface. In other instances, user device 202 may include a separate user interface(s), which may be a keypad, keyboard, or other input device (not shown). In operation, the user device 202 may establish a WLAN link 214 in order to communicate data to or from an external source via an access point (not shown). For example, the user device 202 may include a WiFi radio (not separately shown), which may be part of the interface component 204. The WLAN link 214 may be established over a given 802.11 channel in the 2.4 GHz band or 5 GHz band, for example. Once an active channel exists for the WLAN link 214, content such as streaming video may be transmitted to the user device 202 for presentation. In one implementation, video content may be presented on display 212. If a user desires to view the video content on an external display (not shown), the user device 202 may establish a peer-to-peer session using Miracast, which facilitates transmitting visual content of the display 212 to an external display using a WPAN link 216. Miracast transmission may be possible, for example, as long a transmitting device is configured as a Miracast transmitter and target device that contains the external display is equipped with proper equipment, such as a Miracast adapter. To establish such a session, the user device 202 and external display device may negotiate to establish which device is a group owner (GO). Transmission of video may take then place in either full screen mode in which the video occupies the entirety of the display 212, or in non-full screen mode. In non-full screen mode the video may occupy only a portion such as a video window in the display 212.

In the present embodiments, the interference management component 206 may receive information regarding data load in WiFi channels such as channels in the 2.4 GHz that may be employed to transmit video to the user device 202 over the WLAN link 214. The interference management component 206 may use this information in order to determine how to manage channel allocation for streaming video, manage routing of video through various WLAN or WPAN links, or manage encoding of video to be streamed device. The operations performed by the interference management component 206 may result in some instances in selection of an appropriate WiFi channel in the WPAN link 216, or may result in routing of video through a different WiFi link in other instances as detailed below. Additionally, these operations may entail real-time adaptive management of video encoding over a WPAN link when channel load conditions demand that encoding be adjusted.

Figure 3:
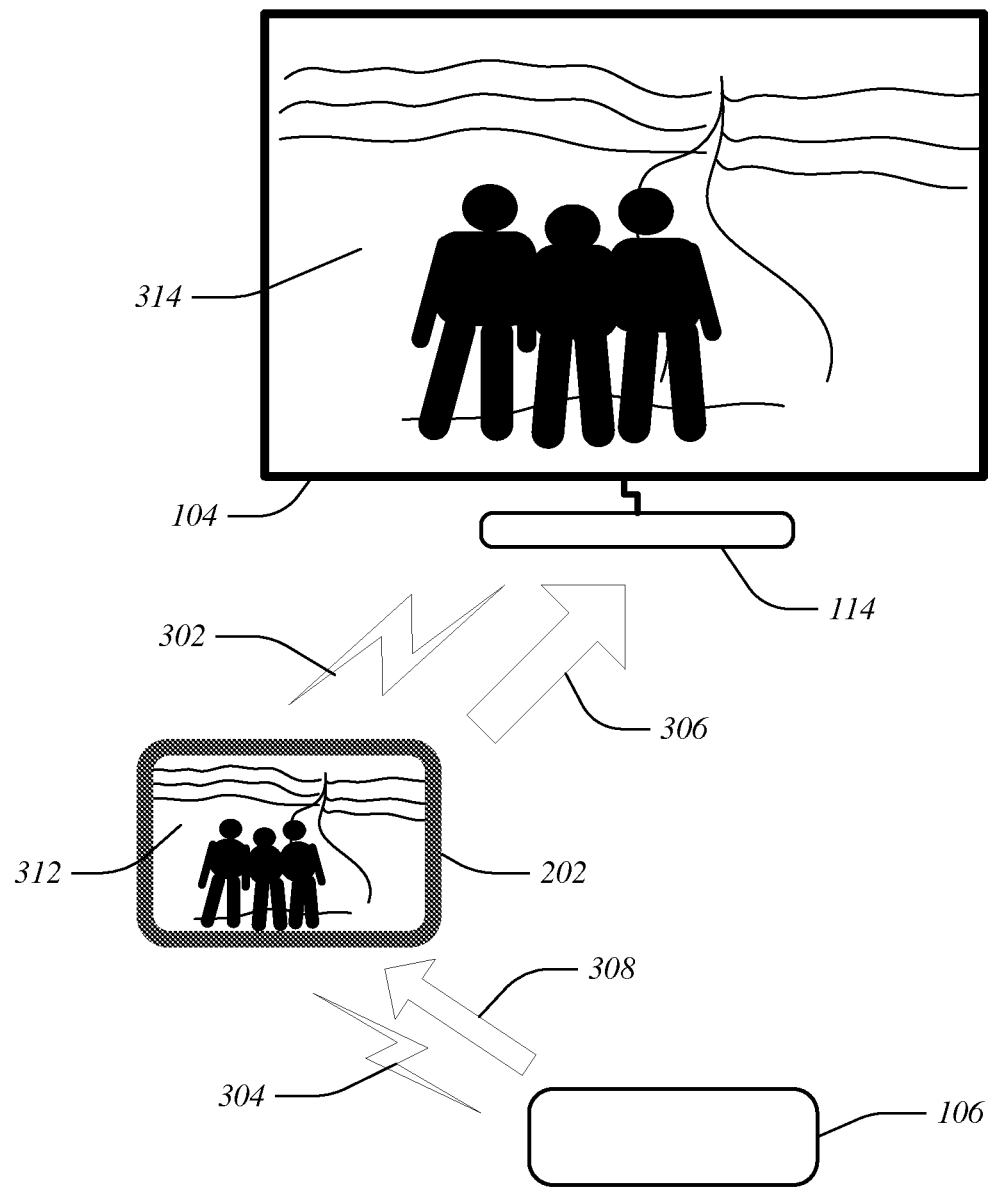
FIG. 3 depicts details of one use scenario for managing wireless communications over multiple wireless links.

In several figures to follow there are shown different use scenarios that illustrate operation of interference management component, which serves to improve video streaming performance when video is to be streamed to a target device. FIG. 3 presents one use scenario for a user device 202 that may be employed to direct the streaming of visual content such as video to the target device 104. In this example, the user device 202 establishes a WLAN link 304 with the access point 106, which may establish an active channel in the 2.4 GHz or 5 GHz 802.11 communications bands. The active channel is used to stream video 308 over the WLAN link 304, which may consume 1-3 MHz bandwidth in some cases.

In various embodiments, the user device 202 includes a WiFi NIC (not shown) that has capability of transmitting video using Miracast and supports dual-channel operation. Dual channel operation may include the scenarios in which an 802.11 channel that is established over the WLAN link 304 is the same as or different from a WPAN channel to be established between the user device 202 and an external device. In addition, in various embodiments, the user device 202 may establish an optimum time sharing algorithm to support the dual channel operation. In some embodiments, the operator of user device 202 may also decide which 802.11 communications band to use to establish the WLAN link 304, and may choose the 5 GHz band when available in some instances. However, in other instances, the operator of user device 202 may select the 2.4 GHz band for a WLAN link 304. In either case, in some implementations it may be assumed that the WLAN channel used by access point 106 in each communications band is fixed. Thus when a WLAN link 304 is established, a known 802.11 channel may be employed to stream video 308 to the user device 202.

When an operator of user device 202 desires to stream video to an external device such as target device 104, the user device 202 may automatically perform a series of operations to select a WiFi channel to carry the video over a WPAN link to be established, such as the WPAN link 302. In some embodiments, the user device 202 may perform a dynamic channel selection algorithm as detailed below to choose a WiFi channel for transmitting video 306 via the WPAN link 302.

Before streaming of video begins, a Miracast group owner (GO) may be established between the user device 102 and adapter 114. In one implementation, the user device 102 may be established as the group owner. Subsequently, in a first operation, the user device 202 may periodically monitor the channel load for each channel in supported 802.11 communication band(s), such as the 2.4 GHz band and optionally 5 GHz band. This monitoring may be performed during idle time before a Miracast/WiDi connection is actively transmitting data, for example. The channel load for a given channel may be measured when any of the following events are triggered: 1) If channel energy is larger than a clear channel assessment (CCA) threshold; 2) a valid 802.11 packet is detected; or 3) a network allocation vector (NAV) is non-zero. The monitoring may be performed by the interface component 204, which may include a wireless network interface controller (WNIC) as noted. Alternatively, if a Miracast adapter as represented by the adapter 114 is enabled as group owner, a WNIC in the adapter 114 may be employed to monitor channel load.

In a subsequent operation, expected throughput EXP_TPT for each channel being monitored is calculated. For example, the interference management component 206 may calculate expected throughput for each channel of 2.4 GHz and 5 GHz communications bands. Those channels having the highest expected throughput may be stored, for example, in a memory 210. In some implementations, the top 2 or top 3 channels having the highest expected throughput may be recorded. In particular, the expected throughput for a given channel Yi, is given by EXP_TPT $CHY_i$=$TPT\_CHY_i$ (1-channel load), where $TPT\_CHY_i$ is the maximum throughput for the channel $Y_i$ for a given WiFi configuration. Among the top candidates, the channel that has the largest expected throughput and at the same time is orthogonal to the active WLAN channel may then be chosen as a select channel for the WPAN link. For example, the active channel used to transmit video 308 over the WLAN link 304 may be known beforehand to the interference management component 206, as discussed above. Among top WiFi channels having the highest expected throughput, if any channel is also orthogonal to the active WiFi channel of the WLAN link 304, that channel having the highest expected throughput is then chosen for use in a Miracast connection to stream the video 306.

FIG. 4 depicts details of channel selection for four different use scenarios or cases, which reflect different combinations of WiFi communications bands that may be supported by a Miracast group owner and by a Miracast group client. In FIG. 4, Yi represents any of 11 channels i of the 2.4 GHz band, and Zi represents any of the 11 channels of the 2.4 GHz band and any of the full set of channels in the 5 GHz band with all supported bandwidths. In case 1, when both group owner and group client support only the 2.4 GHz band, the channel selection proceeds by determining the channel with maximum expected throughput in the 2.4 GHz band that is orthogonal to the active channel of the WLAN link (selected WLAN channel). In case 2, when the group owner supports only the 2.4 GHz band and group client supports the 2.4 GHz band and the 5 GHz band, the channel selection proceeds by determining the channel with maximum expected throughput in the 2.4 GHz band that is orthogonal to the active channel of the WLAN link. In case 3, when the group owner supports the 2.4 GHz band and the 5 GHz band and group client supports only the 2.4 GHz band, the channel selection also proceeds by determining the channel with maximum expected throughput in the 2.4 GHz band that is orthogonal to the active channel of the WLAN link. In case 4, when the group owner supports the 2.4 GHz band and the 5 GHz band and group client also supports the 2.4 GHz band and the 5 GHz band, the channel selection also proceeds by determining the channel with maximum expected throughput in either 2.4 GHz or 5 GHz band that is orthogonal to the active channel of the WLAN link.

Thus, the user device 202 may select WiFi channel for transmitting data over the WPAN link 302 that is different than the WiFi channel used for the WLAN link 304. In this manner data traffic used for a Miracast connection in the WPAN link 302, which may be streaming video that requires a high bandwidth, can be shifted so as not to interfere with data traffic transmitted over the existing WLAN link 304. Additionally, because in some cases the data traffic carried over the WPAN link 302 may be shifted out of a 2.4 GHz band, the data traffic in the WPAN link 302 may avoid other sources of interference that exist in the 2.4 GHz band. Examples of these other interference sources include non-WiFi time-varying interference such as a microwave oven, or a Bluetooth® device (Bluetooth is a trademark of the Bluetooth Special Interest Group).

Once a select channel is identified for the WPAN link 302, video content that is presented on the display 312 of the user device 202 may be transmitted to the target device 104, which presents the video on the display 314. In some instances, as shown in FIG. 3, full screen mode may be employed by the display 312 of user device 202, while in other instances video streaming may take place from a window (not shown) within the display 312.

It is to be noted that in the 2.4 GHz band for any two channels to be orthogonal to one another the channel number difference is at least 5. Thus, the number of candidate channels for a 802.11 WPAN link that are orthogonal to the active WLAN channel may be limited in many instances. For example, in instances in which the 5 GHz band is not available for the 802.11 WLAN link between an access point and user device, or for a 802.11 WPAN link between a user device and target device, only a few or less WiFi channels may be orthogonal to an active WLAN channel. For example, if the active channel of the WLAN link occupies channel 6 of the 2.4 GHz band, and the target device only supports the 2.4 GHz 802.11 band, only channels 1 and 11 would be orthogonal to the active channel. It is further to be noted that under some circumstances channel load for a number of channels within the 802.11 bands may be sufficiently high that the expected throughput does not meet a threshold value to support video streaming or other activity. For example, as suggested by FIG. 3 the bandwidth occupied by streaming video 306 from the user device 202 to target device 104 may be substantially larger than the bandwidth for streaming video 308 to user device 202. In the case of streaming video at 1080p resolution, bandwidth in the range of 9-12 MHz may be needed. Thus, in some instances no WiFi channels from available WiFi bands may be identified that have sufficient expected throughput and are orthogonal to the active channel of the WLAN link.

The present embodiments address the situation in which no channel is identified with sufficient expected throughput that is orthogonal to an active WLAN channel by providing further operations to reconfigure WiFi links to carry data traffic, such as video, or to adjust bit rate of streaming video.

Figure 5:
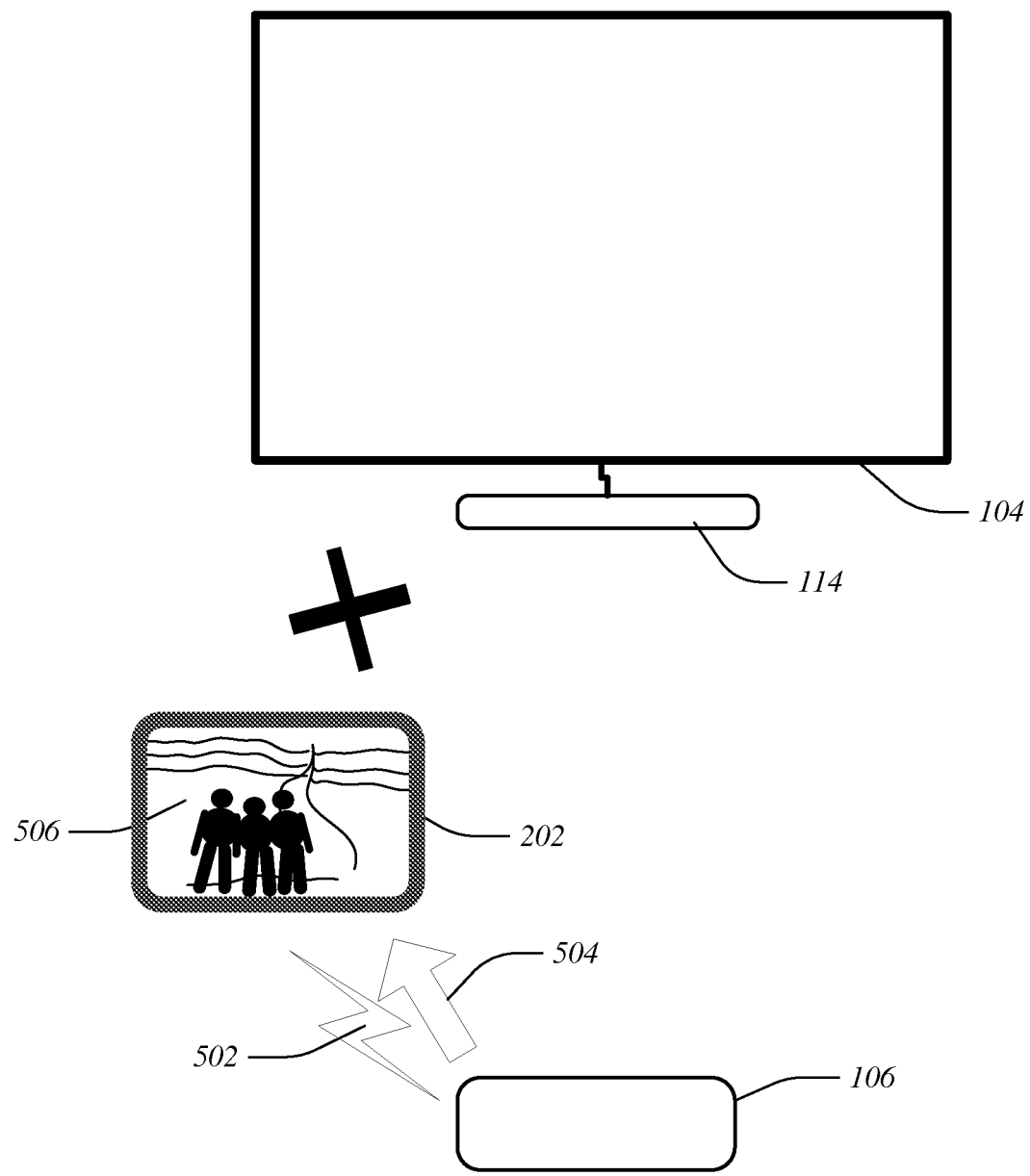
FIG. 5 depicts another use scenario for managing wireless communications over multiple wireless links.

FIG. 5 illustrates a use scenario in which a user device 202 connects to the access point 106 under heavy data traffic conditions. A WLAN link 502 is established between the access point 106 and user device 202. The access point 106 may set up an active channel in an 802.11 communications band to stream video 504 over the WLAN link 502, which video originates from an external source (not shown) such as the Internet. The operator of user device 202 may activate full screen mode so that the video 504 is presented over the entire display 506, as shown. The operator of user device 202 may decide to stream the video 504 to target device 104 to view the video on a larger display and may therefore attempt to activate a peer-to-peer session. However, in this scenario the interference management component 206 of user device 202 may determine that no WiFi channel is present that is orthogonal to the active channel has sufficient expected throughput for video streaming over a WPAN link to be set up between user device 202 and target device 104. In other words, the interference management component 206 may be determine that the expected throughput is below a threshold rate even for the channel that has the highest expected throughput of available WiFi channels and is orthogonal to the active WLAN channel.

In this circumstance the interference management component 206 may switch communications mode for video from a multihop mode to single hop mode when Internet streaming and full screen mode is active. This may be performed in a manner such that the video is not routed through the user device 202. For example, a conventional Miracast mode involves routing visual content from an access point over a WLAN link to a user device, which then transmits the visual content over a WPAN link when Miracast is active. In the present embodiments, when the interference management component 206 detects that full screen mode is active in the user device 202 and video streaming is taking place from an external source external to the user device 202, the interference management component 206 may switch from conventional Miracast mode involving two wireless hops from access point 106 to user device 202 to target device 104, to a direct streaming mode involving a single wireless hop from access point 106 to target device 104. As noted, the switching to direct streaming mode may be triggered when no channel orthogonal to the active channel of the WLAN link 504 is found with sufficient expected throughput.

Figure 6A:
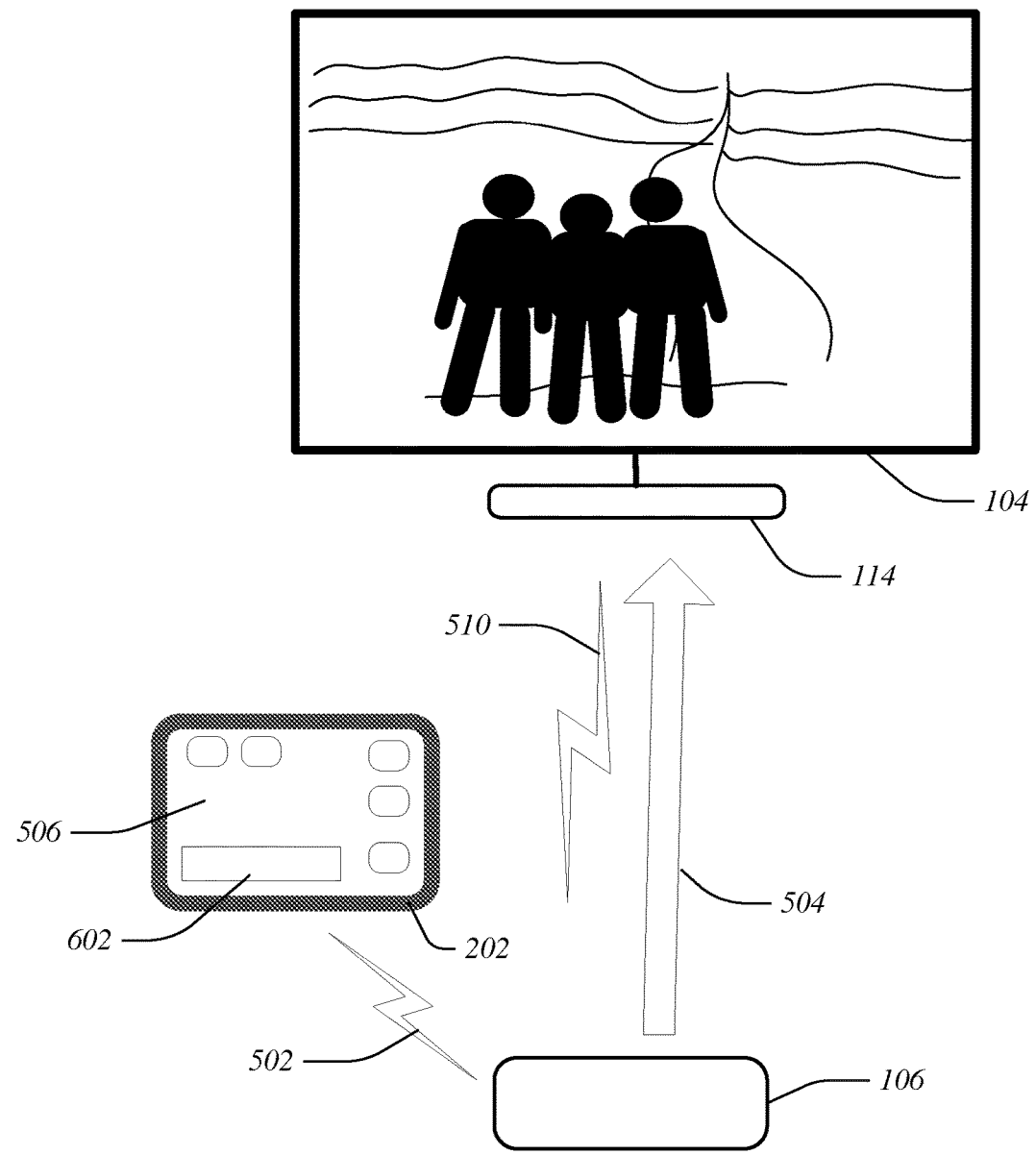
FIG. 6A depicts a further use scenario for managing wireless communications over multiple wireless links.

FIG. 6A depicts implementation of direct streaming mode as a response to the scenario of FIG. 5. As shown, instead of streaming video in two wireless hops, from access point 106 to user device 202 to target device 104, video 504 is directly streamed over a WLAN link 510 between the access point 106 and target device 104. Moreover, because the video 504 streaming now takes place between access point 106 and target device 104, the interference management component 206 may automatically stop streaming of the video 504 to user device 202. Subsequently, the user device 202 may act as a remote control device to manage the streaming of video 504, with the aid, for example, of a user interface 602.

An advantage of this embodiment may be further appreciated by comparison to conventional Miracast operation. It is to be noted that Miracast provides for streaming the whole screen of a user device with any content to a target device such as a TV with very small latency. Furthermore, Miracast allows multitasking on a user device when video is streamed. However, Miracast as conventionally implemented is not optimized when streaming full-screen video from an external source such as the Internet in a heavy data traffic environment. This is because conventional Miracast operates such that for Internet video streaming, the same video content received from the Internet at an access point is repeatedly streamed in two wireless hops, from the access point to user device to target device, as noted above. The streaming bandwidth for the first hop from an access point to user device may require 1-3.6 Mbps, depending on video source. One reasons for this is that the display to present the streaming video may be small area display. However, the streaming bandwidth for the second wireless hop from user device to Miracast adapter (target device) may require 9-12 Mbps for 1080p resolution for proper presentation on what is typically a large area display. Moreover, if both wireless hops employ the same WiFi channel, the separate wireless hops may conflict with one another for wireless bandwidth and create co-channel interference. Even if the WLAN link in the conventional Miracast implementation occupies a different channel than the WPAN link, the second wireless hop over the WPAN link may conflict with other user device for wireless bandwidth in the selected channel of the WPAN link. Thus, in a data traffic-congested environment, the use of two wireless hops to stream video, for example, from an access point to target device, may lead to a more likely or rapid degradation in audio/visual performance as compared to the single hop video streaming afforded by the embodiment of FIG. 6A.

Since the source of streaming video is not the user device itself, but rather the Internet, and since the intended display device to present the video is also not the user device, a further advantage provided by this embodiment is that an unnecessary wireless hop to transmit video to the user device is eliminated. This serves to reduce interference that may degrade performance of other devices operating in the congested environment.

In the scenario of FIG. 6A it is noted that both user device 202 and adapter 114 may be configured with feature extensions that allow the user device 202 to act as a Miracast transmitter to support the direct streaming mode and allow the adapter 114 to act as a Miracast adapter to support the direct streaming mode. In addition, when direct streaming mode is to be established, the interface component 204 may communicate with the adapter 114 to configure the direct streaming mode. In other words, the adapter 114 may be arranged to support two modes: 1) conventional mode in which streaming is conducted over a WPAN link from the user device 202, and a direct streaming mode in which the adapter 114 connects directly via a single wireless hop to the access point 104 over a WLAN link for video streaming. In the direct streaming mode a much larger video buffer size may also be employed.

Likewise, the interface component 204 of user device 202 may be configured to support two modes. In the conventional mode video streaming takes place from the user device 202 to adapter 114, while in the direct streaming mode, the user device acts as a remote control to control video streaming that takes place between the access point 104 and adapter 114 (target device 104). For example, in direct streaming mode, an operator may employ the user interface 602 to send control signals via interface component 204 to the access point 104, to the adapter 114, or to both. Once the interface component 204, which may act as a Miracast/WiDi transmitter, detects that full screen mode is enabled for streaming of data traffic such as video from an external source such as the Internet, the interference management component 206 may determine that the direct streaming mode is to be initiated. In one example, this may take place, when the operator of user device 202 initiates a Miracast session. The interface component 204 may then send commands to adapter 114 to help the adapter 114 become configured for operation in direct streaming mode. Subsequently, the adapter 114 is switched to direct streaming mode and directly connected to the access point 104 via the WLAN link 510 for data traffic streaming. The interface component 204 changes operation to act as a user interface or remote control component to manage the streaming of data traffic such as video 504 across the WLAN link 510. Thus, when data load conditions require, the data traffic flow for full screen internet data traffic streaming is changed from a conventional routing that involves two wireless hops to direct streaming that involves a single wireless hop. As a result, the required bandwidth for one wireless hop is saved, which gives a larger margin for video streaming so that video streaming may be more immune to the time-varying data traffic that may congest the wireless environment.

Figure 6B:
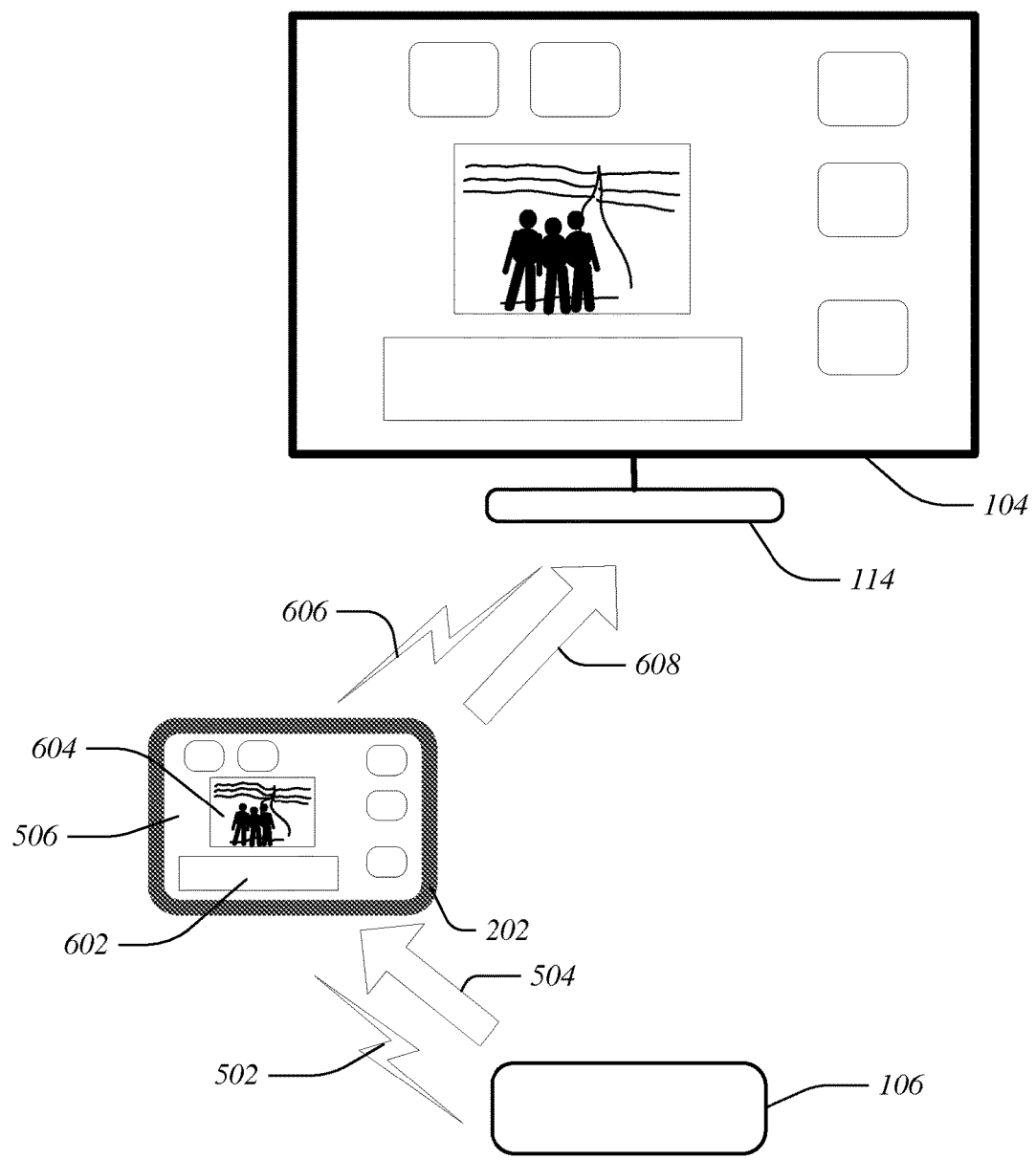
FIG. 6B depicts another use scenario for managing wireless communications over multiple wireless links.

In some embodiments, if an operator of user device 202 subsequently decides to exit the full screen mode for Internet video streaming, the interference management component 206 may generate a popup window or other indication that appears on display 506 and query the operator as to whether the operator wants to share the whole device screen (display 506) to the target device 104, or still wants to stream Internet video from a window only. FIG. 6B depicts a use scenario that may take place when the operator selects to share the entire contents of the display 506 to target device 104. As illustrated, a video window 604 is provided on the display 506 to present streaming video in the user device 202. In response to the selection of sharing the entire contents of the display 506, the interface component 204 may communicate with the adapter 114 to recover the conventional, two-wireless-hop, routing of data traffic flow from access point 106 to user device 202 to target device 104. Accordingly, the video 504 is streamed over the WLAN link 502 from access point 106 to user device 202. The user device 202 then establishes a WPAN link 608 to transmit the visual content 608 to target device 104, including the video 504, which may be presented also in the window 604 as shown.

In additional embodiments, an Ethernet port may be included in the adapter 114 so that the adapter 114 is can be connected over a hardwire connection to the access point 106. In this instance, when full screen mode is detected and video streaming from the Internet is active, the interface component 204 may send signals to the adapter 114 to assist the adapter 114 to change configuration of the data traffic routing so that the data traffic flows from the access point 106 over a single wired hop to the target device 104. This configuration saves additional wireless bandwidth by eliminating wireless bandwidth to carry streaming video over a WLAN link between the access point 106 and user device 202 and further eliminating wireless bandwidth needed to carry the same streaming video over a WPAN link between the user device 202 and adapter 114.

Figure 7:
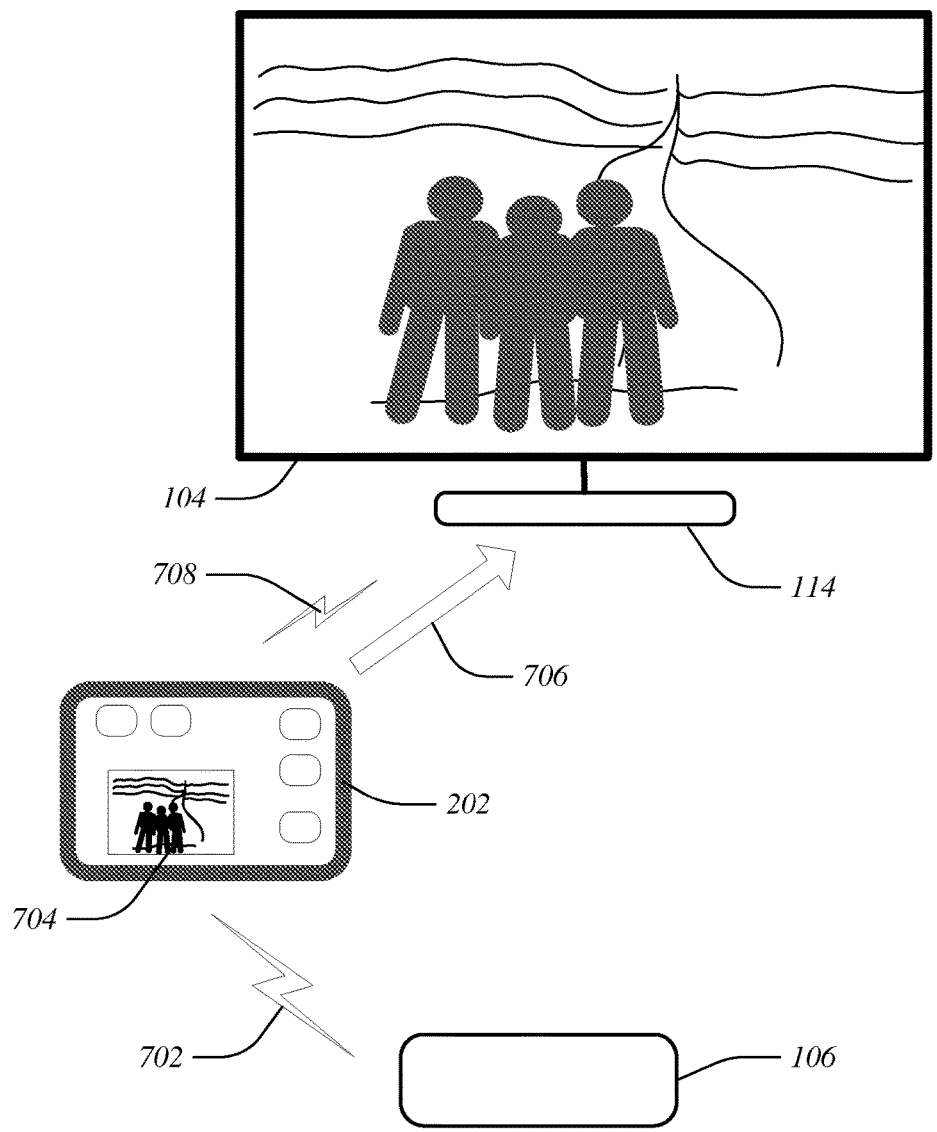
FIG. 7 depicts yet another use scenario for managing wireless communications over multiple wireless links.

FIG. 7 depicts a further use scenario in which video streaming between the user device 202 and target device 104 is adjusted under heavy data traffic conditions when a select channel for the WPAN link that meets an expected throughput is not found. Unlike the use scenarios in FIGS. 5-6B, in this instance both Internet streaming of video and full screen mode are not active. For example, if full screen mode is not active and expected throughput is not sufficient in any candidate WiFi channels, the bandwidth for transmitting data traffic from the user device 202 to target device 104 may be reduced. Likewise, if expected throughput is not sufficient in any candidate WiFi channels, and video local to the user device 202 is to be streamed to the target device 104, the bandwidth for transmitting the video may be reduced.

In the scenario specifically depicted in FIG. 7, the user device 202 may, but need not, have established a WLAN link 702 with the access point 106. However, the operator may wish to stream a video content 704 that is stored in user device 202 for presentation on the target device 104. In this scenario, the interference management component 206 may determine that the video content 704 is to be streamed at a reduced bandwidth in comparison to the bandwidth employed under less congested conditions. Accordingly, a reduced bandwidth video 706 is streamed from the user device 202 over a WPAN link to the adapter 114.

In various embodiments, the interface component 204 may monitor traffic in a WiFi channel or set of channels of an available WiFi band to determine traffic or congestion in a given channel or channels. This may be performed after a WPAN streaming link, such as the WPAN link 708 has been established.

The interference management component 206 may adjust video encoder resolution of the encoder component 208 to accommodate measured congestion as described below. In some embodiments, a congestion indicator may be derived from statistics of a transport stream muxer pipeline to transmit the video data to adapter 114. In other embodiments, the estimated WiFi channel bandwidth available for the WPAN link may be used a congestion indicator when a WiFi driver has capability of supplying this information.

Once a WPAN streaming link is established, the use of a congestion indicator value to estimate congestion based on statistics in a transport stream muxer pipeline to may be especially convenient, because this data is readily accessible during video streaming and not computationally intensive. In contrast use of estimated channel throughput to determine channel congestion may be more computationally burdensome if continuously or periodically used after a WPAN link is established.

The interference management component 206 may adjust video encoder bit rate over multiple video encoder resolutions in some embodiments. For example, video encoder resolutions of 1080p, 720p, and 480p may be supported in some instances. Once the congestion indicator is measured and found to exceed a threshold value, that is, congestion indicator value>Thres_H, the interference management component 206 may send signals to the encoder component 208 to adjust video encoder bit rate downwardly. This may help prevent audio/video problems including pausing, dropping and glitches that may otherwise occur given the current level of congestion in a WiFi channel that carries video over the WPAN link. After the downward adjustment of video encoder bit rate to a lower video encoder bit rate, the congestion indicator value may be evaluated to see if it falls below the threshold value. If so, the lower video encoder bit rate may be employed by encoder 208 to encode video for transmission. In this manner, the bit rate and therefore bandwidth for transmitting streaming video over a WPAN link is reduced to accommodate the current data traffic congestion. If the congestion indicator value still exceeds Thres_H at the lower video encoder bit rate, the video encoder bit rate may be downwardly adjusted to a still lower video encoder bit rate.

It is to be noted that each video encoder resolution (1020p, 780p, and so forth) may cover a range of video encoder bit rate. The design of bit rate range for each resolution may be optimized to minimize the perceived video quality change when video encoder bit rate is adjusted downwardly. In the present embodiments, when video encoder bit rate is adjusted, within a bit rate range that is spanned by a given video encoder resolution, multiple different bit rate levels may be used. Thus, the video encoder bit rate may be adjusted downwardly one step at a time between adjacent video encoder bit rate levels within a given video encoder resolution. Within a given video encoder resolution, if video is encoded at the lowest video encoder bit rate for that video encoder resolution, and the congestion indicator value still exceeds Thres_H, the interference management component 206 may send a signal to use a next lower video encoder resolution. At the same time, the video encoder bit rate may be downwardly adjusted to a level of the highest video encoder bit rate within the next lower video encoder resolution. The video encoder bit rate may be further adjusted downwardly to a next lower video encoder bit rate within the next lower video resolution one step at a time as needed until a satisfactory video encoder bit rate level is reached where the congestion indicator value has a value below Thres_H. Video may then be encoded by encoding component 208 at the satisfactory video encoder bit rate and transmitted to the target device 104 over a WPAN link.

In some embodiments, the congestion indicator value may be monitored after video streaming commences at a satisfactory video encoder bit rate as determined above. The congestion indicator value may be monitored to determine that congestion remains at a satisfactory level such that the congestion indicator value remains below a second threshold, Thres_L, which may be different from Thres_H. If so, the video encoder bit rate may be increased, for example, one step at a time to a next higher video encoder bit rate. If video encoder bit rate is increased to a new video encoder bit rate level and the subsequently measured congestion indicator value remains below Thres_L, the new video encoder bit rate may be adjusted upwardly again. If the use of a video encoder bit rate that corresponds to the highest video encoder bit rate for a given video resolution yields a threshold indicator value that is still below Thres_L, the interference management component 206 may send a signal to use a next higher video encoder resolution and to employ the lowest video encoder bit rate within the next higher video encoder resolution. The video encoder bit rate may then be adjusted upwardly to a next higher video encoder bit rate within the next higher video resolution one step at a time until a new video encoder bit rate level is reached that generates a congestion indicator value that is no longer below Thres_L. Video may then be encoded by encoding component 208 at the new video encoder bit rate level and transmitted to the target device 104 over a WPAN link.

In the above manner, the video encoder bit rate may be dynamically adjusted for video transmission over a WPAN link such as by a Miracast connection so that that a congestion indicator value remains within a range between Thres_L and Thres_H. Moreover, because bandwidth is reduced in an adaptive manner that may be agnostic as to the origin of the congestion, the performance of Miracast/WiDi can be improved to accommodate the presence of any sources of interference that contribute to interference in available WiFi bands. This may include the presence of non-WiFi time-varying interference including that generated by microwave ovens and Bluetooth device operation that generate radio interference in the 2.4 GHz band, and whose level of interference may vary unpredictably and substantially over time.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
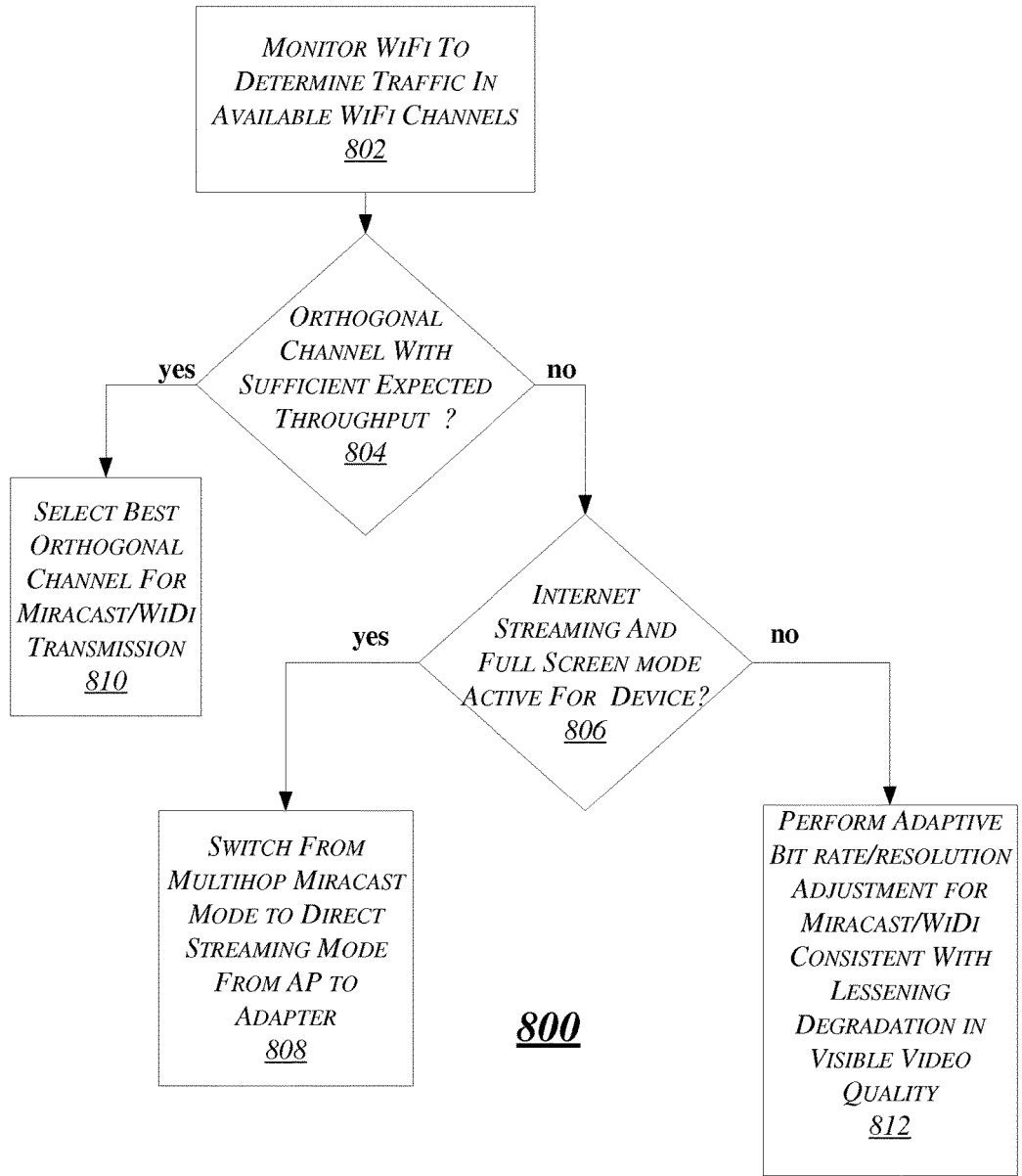
FIG. 8 shows an exemplary first logic flow.

FIG. 8 illustrates an exemplary first logic flow 800. In some examples, the logic flow may be implemented in a wireless device that is capable of communication over multiple 802.11 (WiFi) wireless links. At block 802 an indication of WiFi traffic in available WiFi channels is received. The available WiFi channels may constitute channels in the 2.4 GHz band, 5 GHz band, or both bands, in some instances. The available channels may exclude, for example, an active channel that forms a WLAN link with the wireless device from an access point.

At block 804, a determination is made as to whether an orthogonal channel in the available WiFi channels with sufficient expected throughput is present. A channel may be deemed orthogonal if there is no overlap between the channel and active channel that forms the WLAN link. Expected throughput for each available channel may be determined based upon a maximum throughput of that channel and a measured data load. In some implementations, the channel load for a given channel may be based on measurements performed when any of the following events are triggered: 1) If channel energy is larger than a clear channel assessment (CCA) threshold; 2) a valid 802.11 packet is detected; or 3) a network allocation vector (NAV) is non-zero.

If, at block 804, an orthogonal channel is found with sufficient expected throughput, the flow proceeds to block 810. At block 810, a best (highest expected throughput) orthogonal channel is selected for use in a WPAN link, which may be used for Miracast/WiDi transmission in some examples. If, at block 804 no orthogonal channel is found with sufficient expected throughput, the flow moves to block 806.

At block 806, if an indication is received that Internet streaming and full screen mode are active for the wireless device, the flow proceeds to block 808. At block 808, data routing mode is switched from a mode that employs multiple wireless hops between access point and adapter of a target device to a direct streaming mode in which a single wireless hop takes place between access point and adapter.

If, at block 806 both Internet streaming and full screen mode are not active, the flow proceeds to block 812. At block 812, adaptive adjustment of bit rate/video resolution is performed for transmission of video over a WiFi channel chosen for a WPAN link, such as a Miracast/WiDi connection. The adaptive adjustment may be performed in a manner that is consistent with lessening degradation of visible video quality. The adaptive adjustment may be performed, for example, in a step by step fashion to reduce video encoder bit rate from a first rate to a next lower video encoder bit rate until a congestion indicator value is at an acceptable level.

Figure 9:
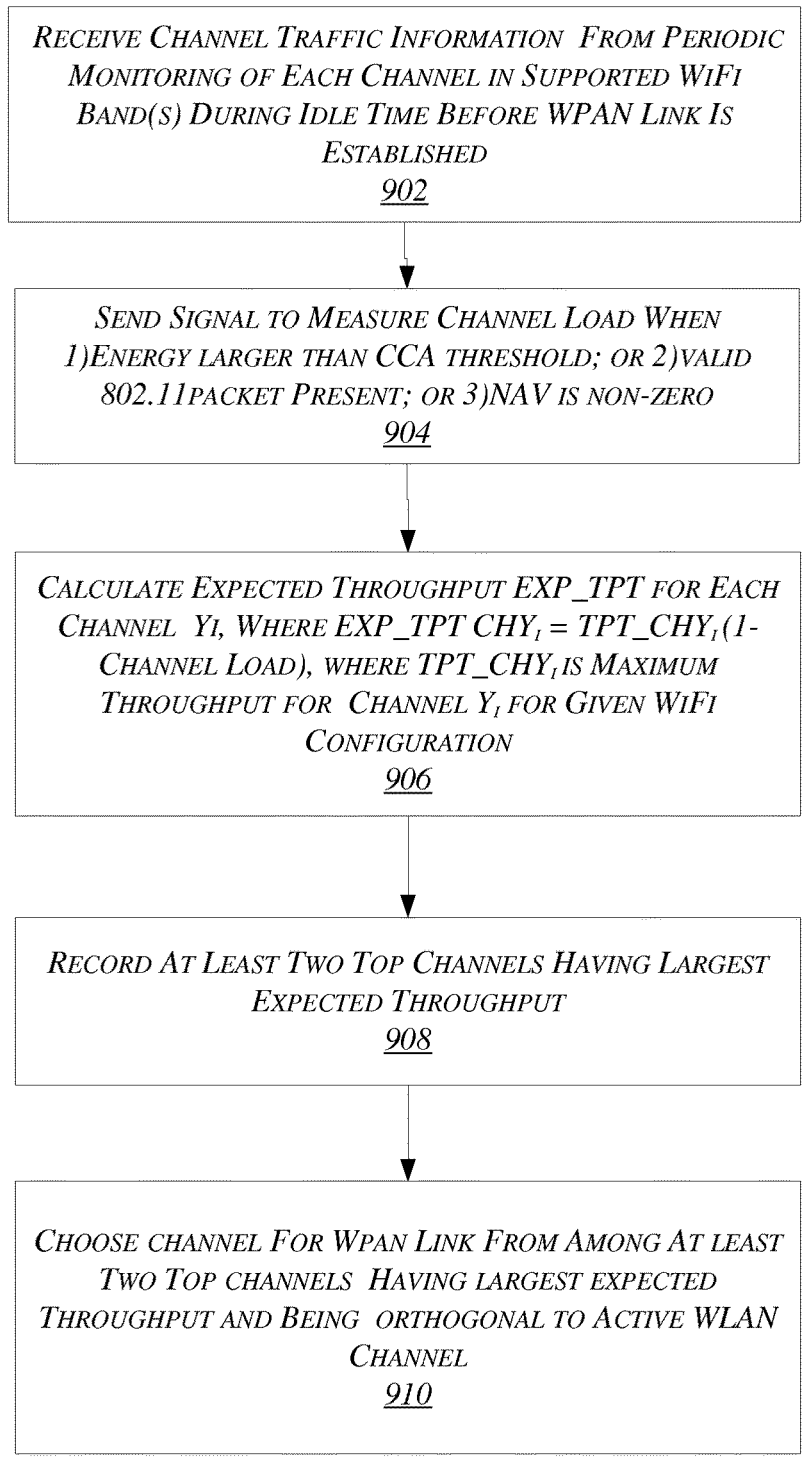
FIG. 9 shows an exemplary second logic flow.

FIG. 9 illustrates an exemplary second logic flow 900. The logic flow 900 may be performed when a WLAN link in an 802.11 communications band is active between a user device and access point. At block 902 channel traffic information is received for each channel in supported WiFi band(s) before a WPAN link is established at the user device. At block 904, a signal is sent to measure channel load when energy in a channel is larger than a clear channel assessment (CCA) threshold; 2) a valid 802.11 packet is detected; or 3) a network allocation vector (NAV) is non-zero.

The flow then proceeds to block 906. At block 906 expected throughput EXP_TPT for each channel being monitored is calculated. For example, expected throughput for each channel of 802.11 2.4 GHz and 5 GHz communications bands may be calculated. The expected throughput for a given channel Yi, may be given by EXP_TPT CHY$_i$=TPT_CHY$_i$ (1-channel load), where TPT_CHY$_i$ is the maximum throughput for the channel Y$_i$ for the given WiFi configuration.

At block 908, at least two top channels having the highest expected throughput may be stored. In one implementation the top 3 channels in terms of expected throughput are stored. The flow then proceeds to block 910.

At block 910, the channel that has the largest expected throughput among the at least two top channels and at the same time is orthogonal to an active WLAN channel is chosen as a select channel for the WPAN link. In one implementation, a channel in the 2.4 GHz WiFi band is deemed orthogonal to the active WLAN channel in the 2.4 GHz band when the channel differs by at least 5 in number from the active WLAN channel.

Figure 10:
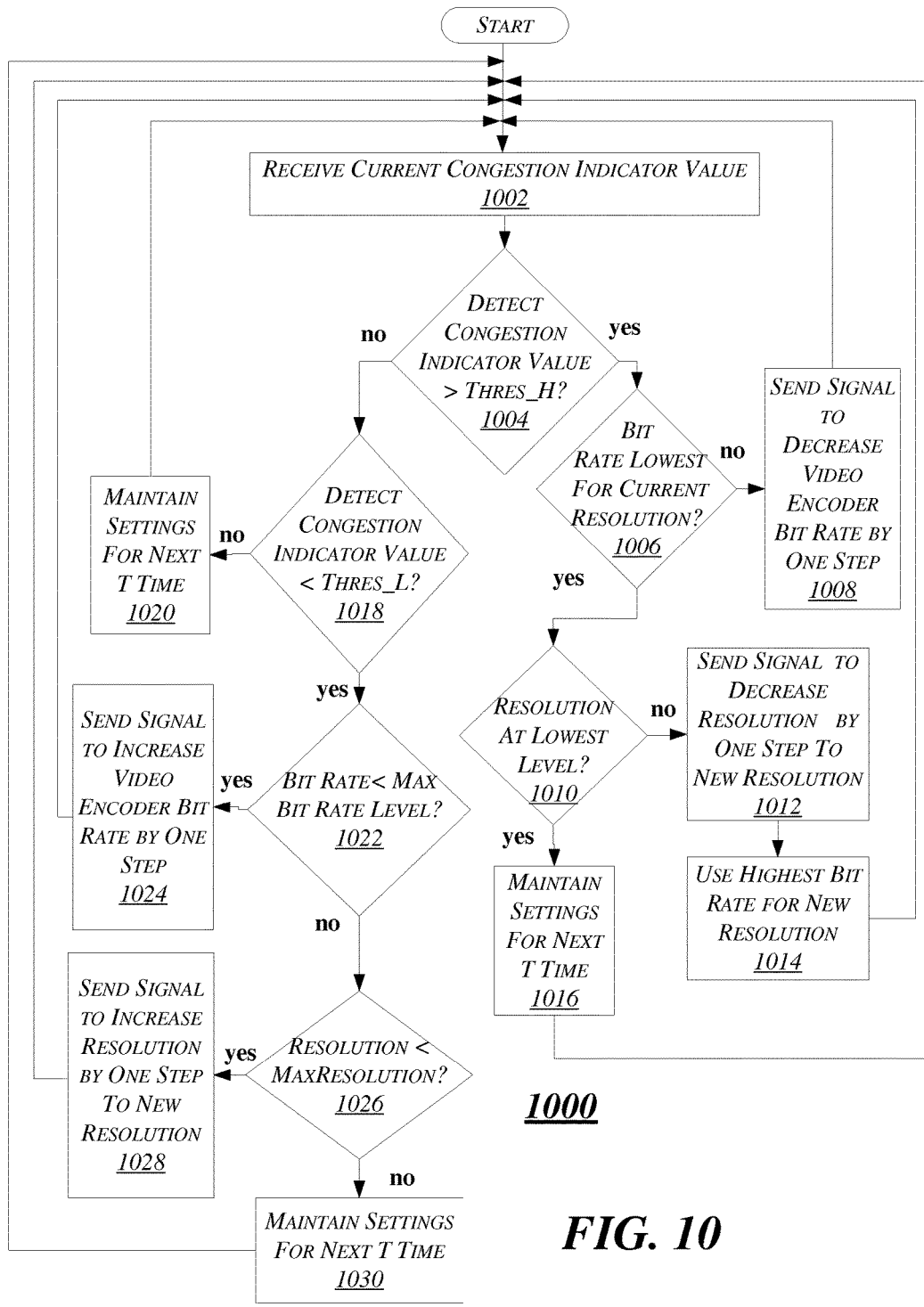
FIG. 10 shows an exemplary third logic flow.

FIG. 10 illustrates an exemplary third logic flow 1000. At block 1002 a current congestion indicator value is received. In some examples, the congestion indicator value may be based upon statistics of video encoder/transmitter muxer pipeline to transmit video data over a WPAN link. In other examples, the estimated WiFi channel bandwidth available for the WPAN link may be used as a congestion indicator value.

At block 1004, if a congestion indicator value is detected that is above a threshold value, T$_{HRES}$_H, the flow proceeds to block 1006. At the block 1006, a determination is made as to whether a video encoder bit rate is the lowest for a current video resolution. If not, the flow proceeds to block 1008, where a signal is sent to decrease video encoder bit rate by one step to a next lower video encoder bit rate, for video to be transmitted. The flow then returns to block 1002.

If, at the block 1006, a determination is made that video encoder bit rate is the lowest for a current video resolution, the flow proceeds to block 1010, where a determination is made as to whether a current video resolution is at the lowest video resolution level. For example video resolutions of 1020p, 780p and 480p may be supported in some instances. If video resolution is not at its lowest level then the flow proceeds to block 1012.

At block 1012 a signal is sent to decrease video resolution to a new level, which may be decreased by one step to a next lowest video resolution. For example, if at block 1010 video encoding bit rate is at the lowest bit rate compatible with 1080p video resolution, a signal may be sent to decrease video resolution to 720p. The flow then proceeds to block 1014 where a video encoding bit rate at the new resolution is used that corresponds to the highest video encoding bit rate for that new video resolution. The flow then returns to block 1002.

If, at block 1010, the video resolution is at the lowest video resolution level, the flow proceeds to block 1016. For example, if a current video resolution is 480p, and represents a lowest video resolution, the flow proceeds to block 1016, where current video encoder settings are maintained for a next transmission of video. The flow then returns to block 1002.

If, at block 1004, a congestion indicator value is detected that is not above a threshold value, T$_{HRES}$_H, the flow proceeds to block 1018. At block 1018 a determination is made as to whether the congestion indicator value is below a second threshold, T$_{HRES}$_L. If not, the flow proceeds to block 1020 where current video encoder settings are maintained for a next transmission of video. The flow then returns to block 1002. If so, the flow proceeds to block 1022.

At block 1022, a determination is made as to whether a current video encoder bit rate is below a maximum encoder bit rate level. If so, the flow proceeds to block 1024 where a signal is sent to increase video encoder rate by one step to a next higher video encoder bit rate. The flow then returns to block 1002.

If, at block 1022, a determination is made that a current video encoder bit rate is not below a maximum encoder bit rate level, that is, if current video encoder bit rate is a maximum video encoder bit rate, the flow proceeds to block 1026. At block 1026 a determination is made as to whether a current video resolution is less than a maximum resolution. If so, the flow proceeds to block 1028 where video resolution is increased by one step to a next higher video resolution. The flow then returns to block 1002.

If, at block 1026, a determination is made that a current video resolution is not less than a maximum resolution, that is, if current video resolution is a maximum video resolution, the flow proceeds to block 1030. At block 1030 current video encoder settings are maintained for a next transmission of video. The flow then returns to block 1002.

As set forth herein the present embodiments provide multiple advantages over conventional WPAN technology that is used for transmitting video or other visual data from a user device to a target device. In particular, the present embodiments provide flexibility for operating in different modes that may be tailored to current data traffic and may afford the ability to reduce wireless hops employed to stream video or other visual content to a target device. For example, in one mode of operation, video may be streamed in a single wireless hop from an access point to a target device without having to stream video to or from a user device that directs the video streaming. In another mode, video or other visual content may be streamed directly from a user device to a target device in a single wireless hop without use of an access point when the user device is the origin of the video or other visual content. In addition, the present embodiments allow both video encoder bit rate and video resolution to be adjusted according to data traffic congestion in the WiFi communications bands.

In summary, various embodiments improve upon present day peer-to-peer video streaming technology by managing video or other data transmission in an intelligent manner using multiple measured or calculated inputs. These inputs include, among others, WiFi channel load in available WiFi channels; identifying WiFi channels that are orthogonal to an active WLAN WiFi channel; congestion indicators when a WPAN link is active; indication whether full screen mode is active; and indication as to whether video is being streamed from an external source such as the Internet. The procedures afforded by the present embodiments for managing these inputs allows high bandwidth video to be transmitted to a target device even under high data traffic conditions by choosing the appropriate WiFi channel or appropriate wireless link or set of wireless links to transmit the video. Consistent with various embodiments, only under specific circumstances is video encoding bit rate reduced to accommodate high data traffic conditions. Moreover, the adjustment of video encoder bit rate may be performed in a step by step fashion that allows video resolution to be maintained over different bit rates, and allows video resolution to be adjusted when congestion conditions indicate to accommodate an appropriate video encoder bit rate that avoids pauses, glitches, and other unwanted features.

Figure 11:
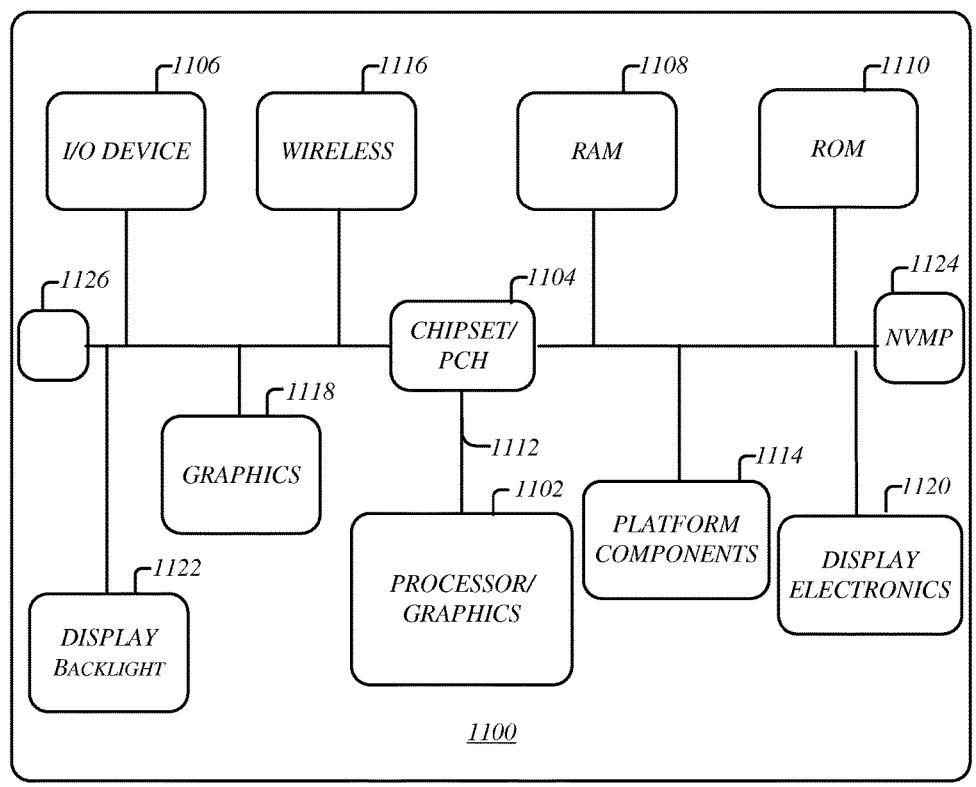
FIG. 11 illustrates an exemplary system architecture.

FIG. 11 is a diagram of an exemplary system embodiment and in particular, FIG. 11 is a diagram showing a system 1100, which may include various elements. For instance, FIG. 11 shows that system (platform) 1100 may include a processor/graphics core, termed herein processor 1102, a chipset/platform control hub (PCH), termed herein chipset 1104, an input/output (I/O) device 1106, a random access memory (RAM) (such as dynamic RAM (DRAM)) 1108, and a read only memory (ROM) 1110, display electronics 1120, display backlight 1122, and various other platform components 1114 (e.g., a fan, a crossflow blower, a heat sink, DTM system, cooling system, housing, vents, and so forth). System 1100 may also include wireless communications chip 1116 and graphics device 1118, non-volatile memory port (NVMP) 1124, and antenna 1126. The embodiments, however, are not limited to these elements.

As shown in FIG. 11, I/O device 1106, RAM 1108, and ROM 1110 are coupled to processor 1102 by way of chipset 1104. Chipset 1104 may be coupled to processor 1102 by a bus 1112. Accordingly, bus 1112 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1102 may be multiple separate processors located on separate integrated circuit chips. In some embodiments processor 1102 may be a processor having integrated graphics, while in other embodiments processor 1102 may be a graphics core or cores. Commands can be provided to processor 1102, for example, through keyboard, touch screen interaction, gestures, facial expressions, and sounds.

The following examples pertain to further embodiments.

Example 1 is an apparatus to manage wireless communications, comprising an interface component to monitor channel load over a multiplicity of communications channels in an least one wireless communications band; and an interference management component to identify an active channel of a wireless local area network (WLAN) link, and identify a select channel from the multiplicity of communications channels that is orthogonal to the active channel of the WLAN link to transmit wireless data over a wireless personal area network (WPAN) link.

In example 2, the at least one wireless communications band of example 1 may comprise a 802.11 2.4 GHz band and a 802.11 5 GHz band.

In example 3, the interference management component of any of examples 1-2 may be to determine the select channel by estimating channel throughput in a select 802.11 channel and at least one additional 802.11 channel that is supported by the WPAN link, the select 802.11 channel and at least one additional 802.11 channel being orthogonal to the active channel.

In example 4, the interface component of any of examples 1-3 may be to determine channel load in a channel of the multiplicity of communications channels when channel energy exceeds a clear channel assessment (CCA) threshold, a valid 802.11 packet is present, or a non-zero value of a network allocation vector (NAV) is detected.

In example 5, the interference management component of any of examples 1-4 may be to identify a highest throughput channel of a multiplicity of 802.11 channels that are orthogonal to the active channel as the select channel.

In example 6, the interference management component of any of examples 1-5 may be to determine the highest throughput channel according to $$\arg\left\{\max_{ChY_i} \text{Exp\_TPT\_Ch } Y_i\right\},$$

where max ChYi Exp_TPT_ChY$_i$ is maximum expected channel throughput of a set of two or more channels Y$_i$, where Exp_TPT Ch Y$_i$ is TPT_ch_Y$_i$ (1-channel load), and where TPT_CH_Y$_i$ is throughput for channel Y$_i$.

In example 7, the interference management component of any of examples 1-6 may be to determine when expected throughput is below a threshold rate for a channel of the multiplicity of communications channels has a highest expected throughput and is orthogonal to the active channel and; and switch a communications mode from a multihop mode to single hop mode when internet streaming and full screen mode is active.

In example 8, the interference management component of any of examples 1-7 may be to switch communications mode by sending a signal to reroute transmission of the wireless data to a destination from a two-hop transmission over both the WLAN link and WPAN link to a one-hop transmission to the destination over the WLAN link.

In example 9, the interface component of any of examples 1-8 may be to determine when a congestion indicator value for transmission of wireless data over the WPAN link is above a first threshold; and the interference management component may be to reduce a video encoder bit rate for wireless data transmission from a first video encoder bit rate to a second video encoder bit rate when Internet streaming or full screen mode is not active and the congestion indicator value is above the first threshold.

In example 10, the congestion indicator value of any of examples 1-9 may be determined from statistics of a transport stream muxer pipeline for transmission of the wireless data over the WPAN link, or from estimated WiFi channel bandwidth available for transmission of the wireless data over the WPAN link.

In example 11, the interference management component of any of examples 1-10 may be to reduce a current bit rate level to a lower bit rate level in a step-like fashion until the congestion indicator value is below the first threshold.

In example 12, the interference management component of any of examples 1-11 may be to reduce a resolution level from a first resolution level to a second resolution level when the congestion indicator value is above the first threshold and a current bit rate level is a lowest bit rate level for the first resolution level.

In example 13 at least one computer-readable storage medium comprises instructions that, when executed, cause a system to receive channel load from over a multiplicity of communications channels in an least one wireless communications band; identify an active channel of a wireless local area network (WLAN) link; and identify a select channel from the multiplicity of communications channels that is orthogonal to the active channel of the WLAN link to transmit wireless data over a wireless personal area network (WPAN) link.

In example 14, the at least one wireless communications band of example 13 may comprise a 802.11 2.4 GHz band and a 802.11 5 GHz band.

In example 15, the at least one computer-readable storage medium of any of examples 13-14 may comprise instructions that, when executed, cause a system to determine the select channel by estimating channel throughput in a select 802.11 channel and at least one additional 802.11 channel that is supported by the WPAN link, the select 802.11 channel and at least one additional 802.11 channel being orthogonal to the active channel.

In example 16, the at least one computer-readable storage medium of any of examples 13-15 may comprise instructions that, when executed, cause a system to determine channel load in a channel of the multiplicity of communications channels when channel energy exceeds a clear channel assessment (CCA) threshold, a valid 802.11 packet is present, or a non-zero value of a network allocation vector (NAV) is detected.

In example 17, the at least one computer-readable storage medium of any of examples 13-16 may comprise instructions that, when executed, cause a system to identify a highest throughput channel of a multiplicity of 802.11 channels that are orthogonal to the active channel as the select channel.

In example 18, the at least one computer-readable storage medium of any of examples 13-17 may comprise instructions that, when executed, cause a system to determine the highest throughput channel according to $$\arg\left\{\max_{ChY_i} \text{Exp\_TPT\_Ch } Y_i\right\},$$

where max ChYi Exp_TPT_ChY$_i$ is maximum expected channel throughput of a set of two or more channels Y$_i$, where Exp_TPT Ch Y$_i$ is TPT_ch_Y$_i$ (1-channel load), and where TPT_CH_Y$_i$ is throughput for channel Y$_i$.

In example 19, the at least one computer-readable storage medium of any of examples 13-18 may comprise instructions that, when executed, cause a system to: determine when expected throughput is below a threshold rate for a channel of the multiplicity of communications channels has a highest expected throughput and is orthogonal to the active channel and; and switch a communications mode from a multihop mode to single hop mode when internet streaming and full screen mode is active.

In example 20, the at least one computer-readable storage medium of any of examples 13-19 may comprise instructions that, when executed, cause a system to: send a signal to reroute transmission of the wireless data to a destination from a two-hop transmission over both the WLAN link and WPAN link to a one-hop transmission to the destination over the WLAN link.

In example 21, the at least one computer-readable storage medium of any of examples 13-20 may comprise instructions that, when executed, cause a system to determine when a congestion indicator value for transmission of wireless data over the WPAN link is above a first threshold; and reduce a video encoder bit rate for wireless data transmission from a first video encoder bit rate to a second video encoder bit rate when Internet streaming or full screen mode is not active and the congestion indicator value is above the first threshold.

In example 22, the at least one computer-readable storage medium of any of examples 13-21 may comprise instructions that, when executed, cause a system to determine the congestion indicator value being from statistics of a transport stream muxer pipeline for transmission of the wireless data over the WPAN link, or from estimated WiFi channel bandwidth available for transmission of the wireless data over the WPAN link.

In example 23, the at least one computer-readable storage medium of any of examples 13-22 may comprise instructions that, when executed, cause a system to reduce a current bit rate level to a lower bit rate level in a step-like fashion until the congestion indicator value is below the first threshold.

In example 24, the at least one computer-readable storage medium of any of examples 13-23 may comprise instructions that, when executed, cause a system to reduce a resolution level from a first resolution level to a second resolution level when the congestion indicator value is above the first threshold and a current bit rate level is a lowest bit rate level for the first resolution level.

In example 25, a method to manage wireless communications may comprise monitoring channel load over a multiplicity of communications channels in an least one wireless communications band; identifying an active channel of a wireless local area network (WLAN) link; and identifying a select channel from the multiplicity of communications channels that is orthogonal to the active channel of the WLAN link to transmit wireless data over a wireless personal area network (WPAN) link.

In example 26, the method of example 25 may comprise determining the select channel by estimating channel throughput in a select 802.11 channel and at least one additional 802.11 channel that is supported by the WPAN link, the select channel and at least one additional 802.11 channel being orthogonal to the active channel.

In example 27, the method of any of examples 25-26 may comprise determining channel load in a channel of the multiplicity of communications channels when channel energy exceeds a clear channel assessment (CCA) threshold, a valid 802.11 packet is present, or a non-zero value of a network allocation vector (NAV) is detected.

In example 28, the method of any of examples 25-27 may comprise identifying a highest throughput channel of a multiplicity of 802.11 channels that are orthogonal to the active channel as the select channel.

In example 29, the method of any of examples 25-28 may comprise determining the highest throughput channel according to $$\arg\left\{\max_{ChY_i} \text{Exp\_TPT\_Ch } Y_i\right\},$$

where max ChYi Exp_TPT_ChY$_i$ is maximum expected channel throughput of a set of two or more channels Y$_i$, where Exp_TPT Ch Y$_i$ is TPT_ch_Y$_i$ (1-channel load), and where TPT_CH_Y$_i$ is throughput for channel Y$_i$. In example 30, the method of any of examples 25-29 may comprise determining when expected throughput is below a threshold rate for a channel of the multiplicity of communications channels that is orthogonal to the active channel and has a highest expected throughput; and switching a communications mode from a multihop mode to single hop mode when internet streaming and full screen mode is active.

In example 31, the switching the communications mode of any of examples 25-30 may comprise sending a signal to reroute transmission of the wireless data to a destination from a two-hop transmission over both the WLAN link and WPAN link to a one-hop transmission to the destination over the WLAN link.

In example 32, the method of any of examples 25-31 may comprise determining when a congestion indicator value for transmission of wireless data over the WPAN link is above a first threshold; and reducing a video encoder bit rate for wireless data transmission from a first video encoder bit rate to a second video encoder bit rate when Internet streaming or full screen mode is not active and the congestion indicator value is above the first threshold.

In example 33 the method of any of examples 25-32 may comprise determining the congestion indicator value from statistics of a transport stream muxer pipeline for transmission of the wireless data over the WPAN link, or from estimated WiFi channel bandwidth available for transmission of the wireless data over the WPAN link.

In example 34, the method of any of examples 25-33 may comprise reducing a current bit rate level to a lower bit rate level in a step-like fashion until the congestion indicator value is below the first threshold.

In example 35, the method of any of examples 25-34 may comprise reducing a resolution level from a first resolution level to a second resolution level when the congestion indicator value is above the first threshold and a current bit rate level is a lowest bit rate level for the first resolution level.

Example 36 is user equipment to manage wireless communications comprising means to perform the method of any of examples 25 to 35.

Example 37 is an apparatus to manage wireless communications comprising means to perform the method of any of examples 25 to 35.

Example 38 is a wireless device to manage communications of wireless data, comprising an interface component to monitor channel load over a multiplicity of communications channels in an least one wireless communications band; an interference management component to identify an active channel of a wireless local area network (WLAN) link, and identify a select channel from the multiplicity of communications channels that is orthogonal to the active channel of the WLAN link to transmit wireless video data over a wireless personal area network (WPAN) link; and a display to present the wireless data.

In example 39, the at least one wireless communications band of example 38 may comprise a 802.11 2.4 GHz band and a 802.11 5 GHz band.

In example 40, the interference management component of any of examples 38-39 may be to determine the select channel by estimating channel throughput in a select 802.11 channel and at least one additional 802.11 channel that is supported by the WPAN link, the select 802.11 channel and at least one additional 802.11 channel being orthogonal to the active channel.

In example 41, the interface component of any of examples 38-40 may be to determine channel load in a channel of the multiplicity of communications channels when channel energy exceeds a clear channel assessment (CCA) threshold, a valid 802.11 packet is present, or a non-zero value of a network allocation vector (NAV) is detected.

In example 42, the interference management component of any of examples 38-41 may be to identify a highest throughput channel of a multiplicity of 802.11 channels that are orthogonal to the active channel as the select channel.

In example 43, the interference management component of any of examples 38-42 may be to determine when expected throughput is below a threshold rate for a channel of the multiplicity of communications channels has a highest expected throughput and is orthogonal to the active channel and; and switch a communications mode from a multihop mode to single hop mode when internet streaming and full screen mode is active.

In example 44, the interface component of any of examples 38-43 may be to determine when a congestion indicator value for transmission of wireless data over the WPAN link is above a first threshold; and the interference management component may be to reduce a video encoder bit rate for wireless data transmission from a first video encoder bit rate to a second video encoder bit rate when Internet streaming or full screen mode is not active and the congestion indicator value is above the first threshold.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
an interface circuit element to monitor channel load over a multiplicity of communications channels in at least one wireless communications band and to determine channel load in a channel of the multiplicity of communications channels when channel energy exceeds a clear channel assessment (CCA) threshold; and
an interface management circuit element to identify an active channel of a wireless local area network (WLAN) link, and identify a select channel from the multiplicity of communications channels that is orthogonal to the active channel of the WLAN link to transmit wireless data over a wireless personal area network (WPAN) link.

2. The apparatus of claim 1, wherein the at least one wireless communications band comprising a 802.11 2.4 GHz band and a 802.11 5 GHz band.

3. The apparatus of claim 1, wherein the interference management component to determine the select channel by estimating channel throughput in a select 802.11 channel and at least one additional 802.11 channel that is supported by the WPAN link, the select 802.11 channel and at least one additional 802.11 channel being orthogonal to the active channel.

4. The apparatus of claim 1, wherein the interference management component to identify a highest throughput channel of a multiplicity of 802.11 channels that are orthogonal to the active channel as the select channel.

5. The apparatus of claim 4, wherein the interference management component to determine the highest throughput channel according to $$\arg\left\{\max_{ChY_i} \overline{\text{Exp\_TPT\_Ch } Y_i}\right\},$$

where max ChYi Exp_TPT_ChY$_i$ is maximum expected channel throughput of a set of two or more channels Y$_i$, where Exp_TPT Ch Y$_i$ is TPT_ch_Y$_i$ (1-channel load), and where TPT_CH_Y$_i$ is throughput for channel Y$_i$.

6. The apparatus of claim 1, wherein the interference management component to:
determine when expected throughput is below a threshold rate for a channel of the multiplicity of communications channels has a highest expected throughput and is orthogonal to the active channel and; and
switch a communications mode from a multihop mode to single hop mode when internet streaming and full screen mode is active.

7. The apparatus of claim 6, wherein the interference management component to switch communications mode by sending a signal to reroute transmission of the wireless data to a destination from a two-hop transmission over both the WLAN link and WPAN link to a one-hop transmission to the destination over the WLAN link.

8. The apparatus of claim 1, wherein
the interface component to determine when a congestion indicator value for transmission of wireless data over the WPAN link is above a first threshold; and
the interference management component to reduce a video encoder bit rate for wireless data transmission from a first video encoder bit rate to a second video encoder bit rate when Internet streaming or full screen mode is not active and the congestion indicator value is above the first threshold.

9. The apparatus of claim 8, wherein the congestion indicator value being determined from statistics of a transport stream muxer pipeline for transmission of the wireless data over the WPAN link, or from estimated WiFi channel bandwidth available for transmission of the wireless data over the WPAN link.

10. The apparatus of claim 8 the interference management component to:
reduce a current bit rate level to a lower bit rate level in a step-like fashion until the congestion indicator value is below the first threshold.

11. The apparatus of claim 8, the interference management component to reduce a resolution level from a first resolution level to a second resolution level when the congestion indicator value is above the first threshold and a current bit rate level is a lowest bit rate level for the first resolution level.

12. At least one non-transitory computer-readable storage medium comprising instructions that, when executed, cause a system to:
receive channel load from over a multiplicity of communications channels in at least one wireless communications band;
determine channel load in a channel of the multiplicity of communications channels when channel energy exceeds a clear channel assessment (CCA) threshold;
identify an active channel of a wireless local area network (WLAN) link; and
identify a select channel from the multiplicity of communications channels that is orthogonal to the active channel of the WLAN link to transmit wireless data over a wireless personal area network (WPAN) link.

13. The at least one non-transitory computer-readable storage medium of claim 12, the at least one wireless communications band comprising a 802.11 2.4 GHz band and a 802.11 5 GHz band.

14. The at least one non-transitory computer-readable storage medium of claim 12, comprising instructions that, when executed, cause a system to determine the select channel by estimating channel throughput in a select 802.11 channel and at least one additional 802.11 channel that is supported by the WPAN link, the select 802.11 channel and at least one additional 802.11 channel being orthogonal to the active channel.

15. The at least one non-transitory computer-readable storage medium of claim 12, comprising instructions that, when executed, cause a system to identify a highest throughput channel of a multiplicity of 802.11 channels that are orthogonal to the active channel as the select channel.

16. The at least one non-transitory computer-readable storage medium of claim 12, comprising instructions that, when executed, cause a system to:
  determine when expected throughput is below a threshold rate for a channel of the multiplicity of communications channels has a highest expected throughput and is orthogonal to the active channel and; and
  switch a communications mode from a multihop mode to single hop mode when internet streaming and full screen mode is active.

17. The at least one non-transitory computer-readable storage medium of claim 12, comprising instructions that, when executed, cause a system to: send a signal to reroute transmission of the wireless data to a destination from a two-hop transmission over both the WLAN link and WPAN link to a one-hop transmission to the destination over the WLAN link.

18. The at least one non-transitory computer-readable storage medium of claim 12, comprising instructions that, when executed, cause a system to:
  determine when a congestion indicator value for transmission of wireless data over the WPAN link is above a first threshold; and
  reduce a video encoder bit rate for wireless data transmission from a first video encoder bit rate to a second video encoder bit rate when Internet streaming or full screen mode is not active and the congestion indicator value is above the first threshold.

19. A method, comprising:
  monitoring channel load in a channel of the multiplicity of communications channels in at least one wireless communication bands;
  determining channel load in a channel of the multiplicity of communications channels when channel energy exceeds a clear channel assessment (CCA) threshold;
  identifying an active channel of a wireless local area network (WLAN) link; and
  identifying a select channel from the multiplicity of communications channels that is orthogonal to the active channel of the WLAN link to transmit wireless data over a wireless personal area network (WPAN) link.

20. The method of claim 19, comprising determining the select channel by estimating channel throughput in a select 802.11 channel and at least one additional 802.11 channel that is supported by the WPAN link, the select channel and at least one additional 802.11 channel being orthogonal to the active channel.

21. The method of claim 19, comprising identifying a highest throughput channel of a multiplicity of 802.11 channels that are orthogonal to the active channel as the select channel.

22. The method of claim 19, comprising:
  determining when expected throughput is below a threshold rate for a channel of the multiplicity of communications channels that is orthogonal to the active channel and has a highest expected throughput; and
switching a communications mode from a multihop mode to single hop mode when internet streaming and full screen mode is active.

* * * * *